United States Patent
Zimmermann et al.

(10) Patent No.: US 7,685,875 B2
(45) Date of Patent: Mar. 30, 2010

(54) FLUID FLOW RATE SENSOR AND METHOD OF OPERATION

(75) Inventors: Bernd D. Zimmermann, Ashland, OH (US); Donald G. Cunitz, Mansfield, OH (US); David W. Reynolds, Galion, OH (US); Philip S. Young, Ashland, OH (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 170 days.

(21) Appl. No.: 11/876,980

(22) Filed: Oct. 23, 2007

(65) Prior Publication Data

US 2009/0100924 A1 Apr. 23, 2009

(51) Int. Cl.
*G01F 1/68* (2006.01)
(52) U.S. Cl. .................................... 73/204.23
(58) Field of Classification Search ................ 73/118.2, 73/861.52, 204.14, 204.16, 73; 137/2; 374/16; 702/100
See application file for complete search history.

(56) References Cited

U.S. PATENT DOCUMENTS

| | | | | |
|---|---|---|---|---|
| 4,420,971 A | * | 12/1983 | Rapps et al. | 73/114.34 |
| 4,474,058 A | * | 10/1984 | Drews et al. | 73/114.34 |
| 4,487,213 A | * | 12/1984 | Gates et al. | 137/2 |
| 5,076,099 A | | 12/1991 | Hisanaga et al. | |
| 5,150,611 A | * | 9/1992 | Kleinhans | 73/204.14 |
| 7,003,418 B2 | * | 2/2006 | Bonne et al. | 702/100 |
| 7,318,351 B2 | * | 1/2008 | Cobianu et al. | 73/715 |
| 2005/0284216 A1 | | 12/2005 | Tanaka et al. | |

FOREIGN PATENT DOCUMENTS

| | | |
|---|---|---|
| JP | 8-62010 | 3/1996 |
| JP | 11-64062 | 3/1999 |
| JP | 2004-205376 | 7/2004 |

* cited by examiner

*Primary Examiner*—Jewel Thompson
(74) *Attorney, Agent, or Firm*—Harness, Dickey & Pierce, P.L.C.

(57) ABSTRACT

A fluid flow rate sensor includes a detection circuit which generates a first signal corresponding to an output voltage of a bridge circuit, and a second signal corresponding to a fluid temperature. A control module can more accurately and quickly determine the fluid flow rate based on the first signal, the second signal and a look-up table. The look-up table includes a plurality of curves plotted according to data, indicating relationship among the fluid temperature, the output voltage and the fluid flow rate. The fluid flow rate sensor is inherently temperature compensated and has a shorter response time.

32 Claims, 7 Drawing Sheets

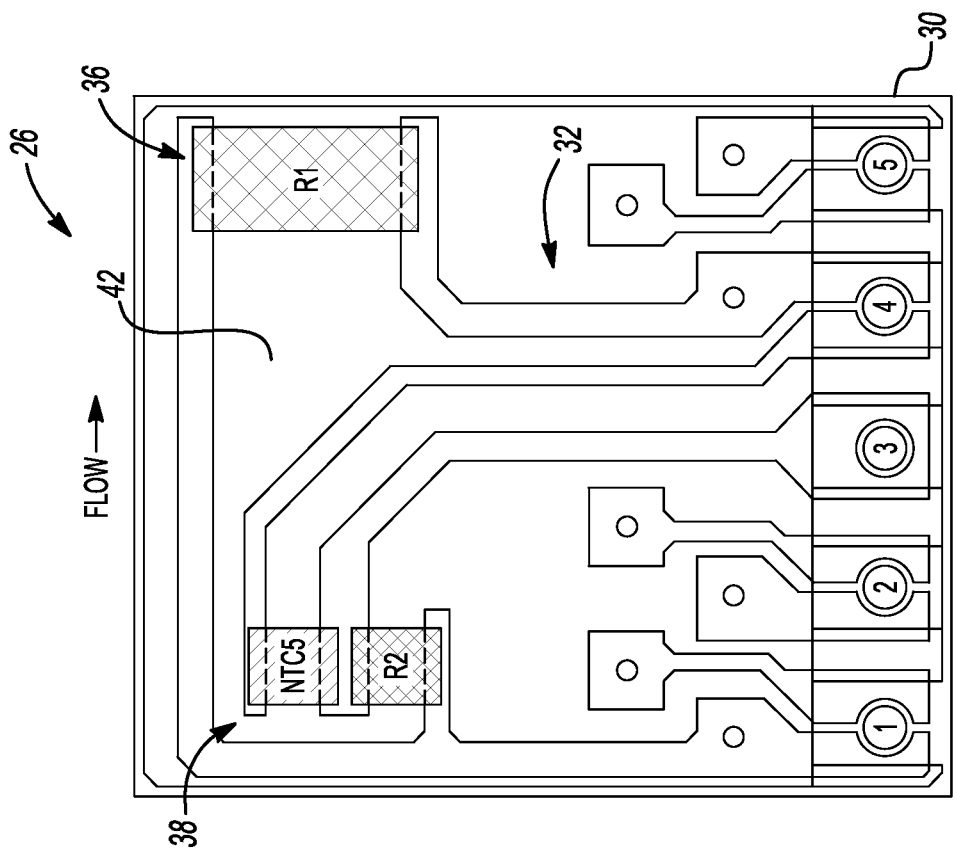
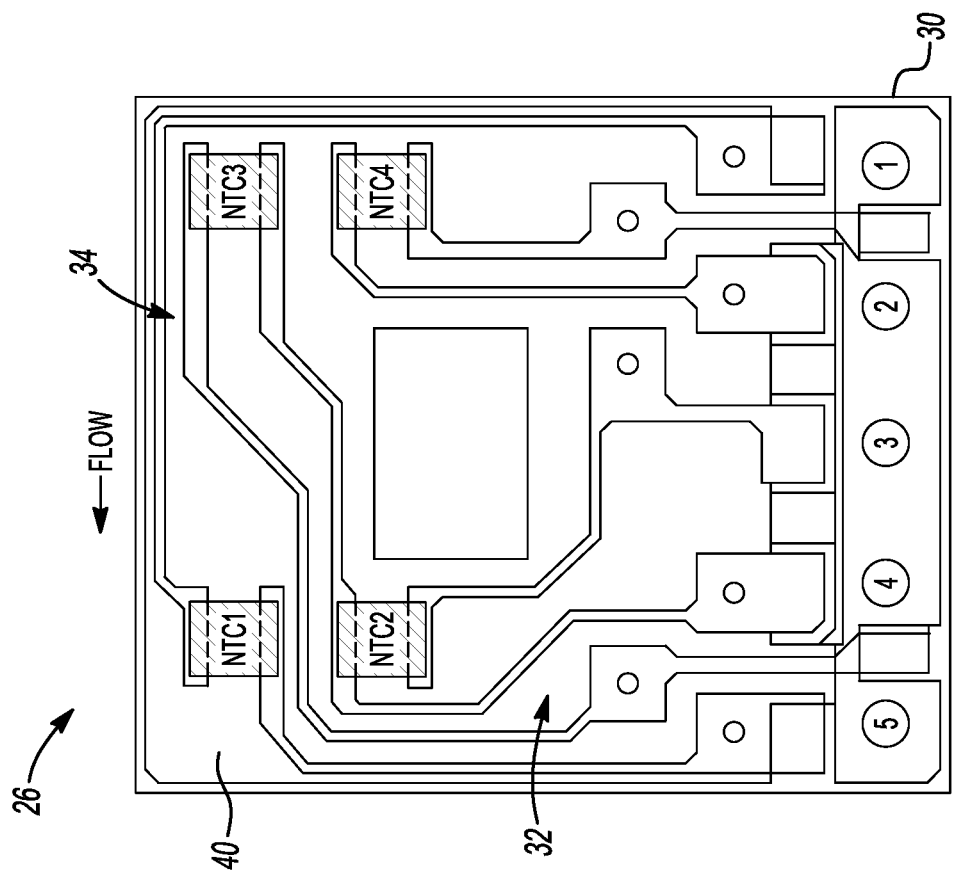

FLUID FLOW RATE SENSOR AND METHOD OF OPERATION

FIELD

The present disclosure generally relates to fluid flow rate sensors, and more particularly to thermo-anemometers and their methods of operation.

BACKGROUND

The statements in this section merely provide background information related to the present disclosure and may not constitute prior art.

Fluid delivery systems may include fluid flow meters to measure the flow rate of the fluid in the fluid delivery systems, and thus to determine the volume of the fluid to be dispensed based on the flow rate. Thermo-anemometers have been commonly used for measuring the fluid flow rate over turbine and/or paddlewheel sensors for their lack of moving parts, which are sensitive to contamination of the fluid. A thermo-anemometer operates based on the principles of heat transfer and typically includes a bridge circuit having a resistive heating element subjected to the stream of fluid flow. As the fluid flow passes over the resistive heating element, the fluid carries away heat, resulting in a temperature drop in the resistive heating element. The flow rate of the fluid can be determined by measuring the heat loss from the heating element to the fluid.

In one method, the power to the heating element is increased after a temperature drop occurs in the bridge circuit to bring the heating element back to its starting temperature (constant-temperature type). The increased power gives an indication of the fluid flow rate. Another method involves correlating the voltage drop across the bridge circuit to determine the flow rate (constant-current type).

In either method, the conventional thermo-anemometers have limitations in response time. The flow rate can not be accurately measured until the fluid flow, and hence the signals indicative of the fluid flow rate, reach a steady state. Some thermo-anemometers may require a relatively long time period to measure the flow rate of the fluid.

Another issue with the thermo-anemometers is the need for temperature compensation and part-to-part calibration. A lower temperature fluid has a greater capacity to remove heat from the resistive heating element than a higher temperature fluid at the same flow rate. Therefore, temperature compensation is generally required. Part-to-part calibration may require expensive software and may be difficult to implement in a manufacturing environment.

SUMMARY

Several embodiments of the present disclosure provide for fluid flow rate sensors which can more accurately and quickly determine the fluid flow rate, and which are self-calibrated and temperature compensated. In one form, a fluid flow rate sensor for detecting a flow rate of a fluid includes a probe module, a look-up table and a control module. The probe module generates a first signal corresponding to an output voltage and a second signal corresponding to a temperature of the fluid. The look-up table includes empirical data of a relationship among the output voltage of the detection circuit, the temperature of the fluid, and the flow rate of the fluid. The control module determines the flow rate of the fluid based on the first signal, the second signal, and the look-up table.

In another form, a fluid flow rate sensor for detecting a flow rate of a fluid includes a bridge circuit for generating an output voltage, a temperature sensing circuit for detecting a temperature of the fluid, a heating circuit for heating at least one thermistor of the bridge circuit and a control module. The bridge circuit, the temperature sensing circuit and the heating circuit are connected in parallel. The output voltage is a function of the temperature and the flow rate of the fluid. The control module determines the flow rate of the fluid based on a look-up table which indicates a relationship among the flow rate of the fluid, the temperature of the fluid and the output voltage of the bridge circuit based on empirical data.

In yet another form, a method of operating a fluid flow rate sensor comprising a detection circuit is provided and includes measuring a temperature of the fluid, measuring a voltage output of the detection circuit, and determining the fluid flow rate based on a look-up table. The look-up table indicates a relationship among the output voltage of the detection circuit, the temperature of the fluid, and a flow rate of the fluid.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a front view of a printed circuit board including an exemplary detection circuit of a fluid flow rate sensor according to the present disclosure;

FIG. 6 is a rear view of a printed circuit board including an exemplary detection circuit of a fluid flow rate sensor according to the present disclosure;

Figure 11:
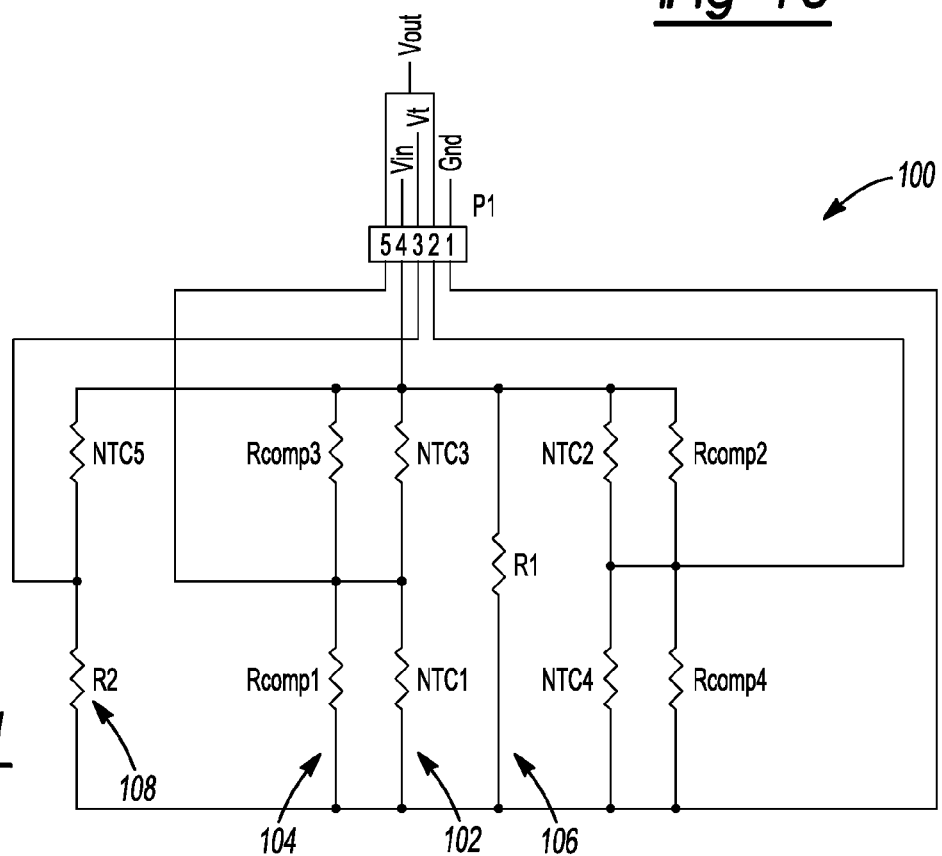
Figure 12:
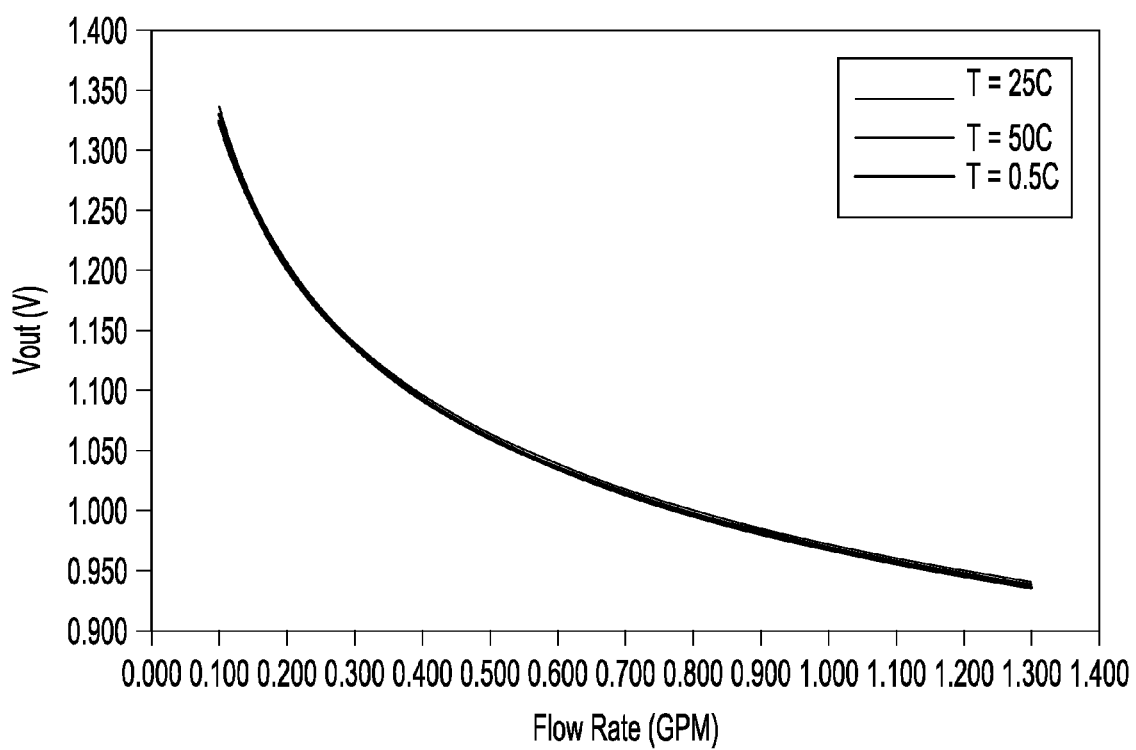

FIG. 11 is a schematic circuit diagram of another exemplary detection circuit for a fluid flow rate sensor with temperature compensation circuitry, according to the present disclosure; and FIG. 12 is a graph showing the relationship between a flow rate and an output voltage, and the fluid temperature and illustrating the content of a one-dimensional look-up table for use in an embodiment of a fluid flow rate sensor with temperature compensation according to the present disclosure.

DETAILED DESCRIPTION

The following description is merely exemplary in nature and is not intended to limit the present disclosure, application, or uses.

Figure 1:
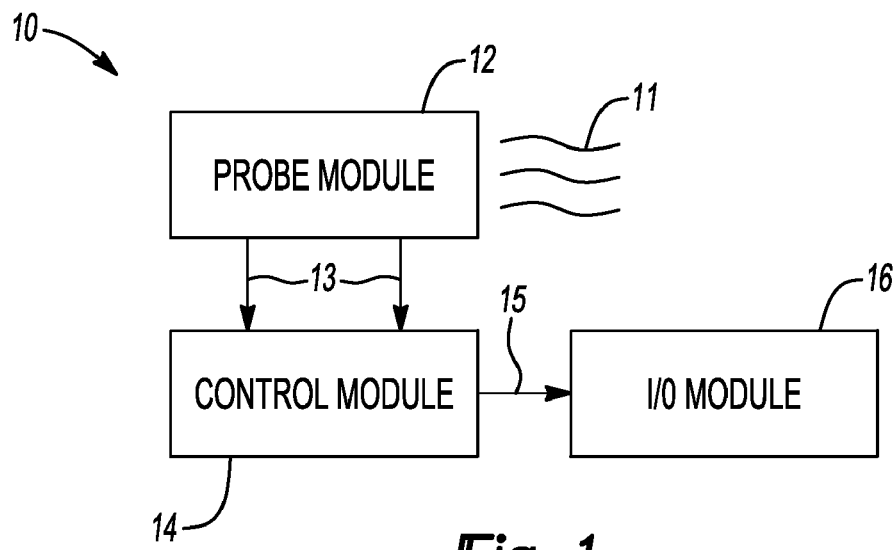
FIG. 1 is a schematic block diagram of a fluid flow rate sensor according to the present disclosure.
Figure 2:
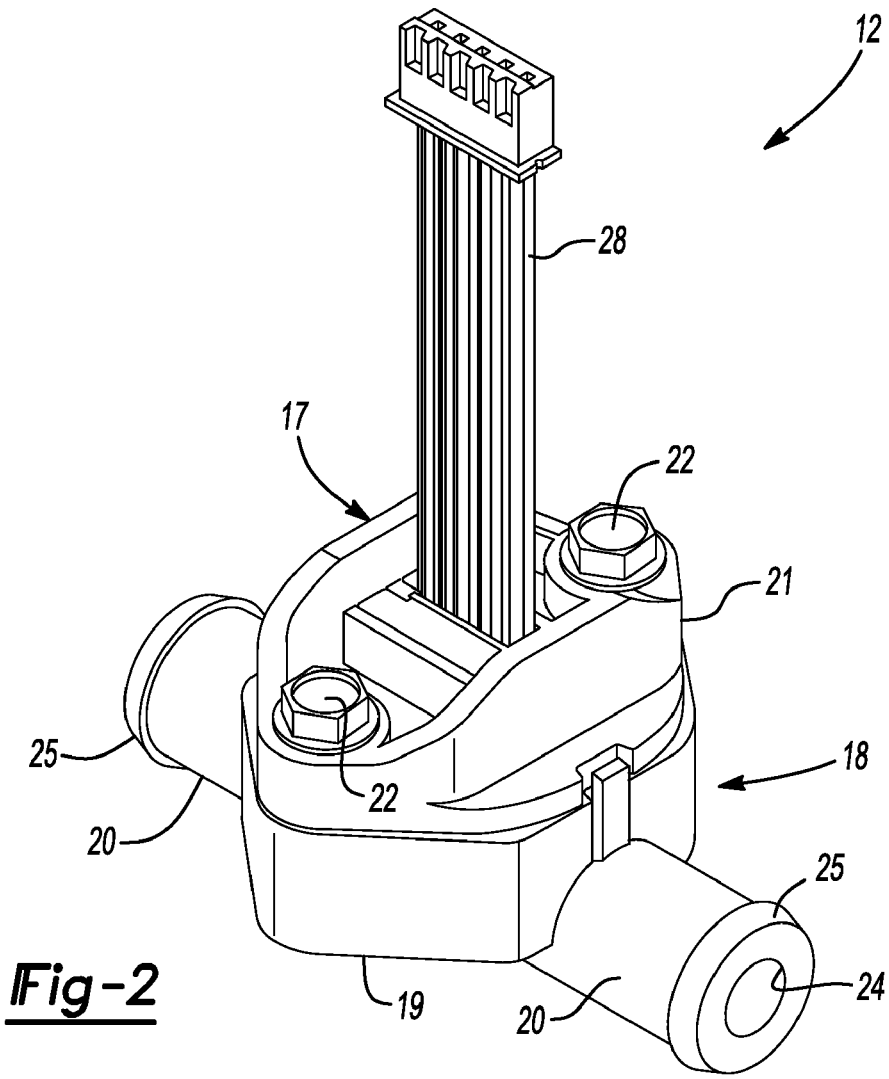
FIG. 2 is a perspective view of an exemplary probe module of a fluid flow rate sensor according to the present disclosure.
Figure 3:
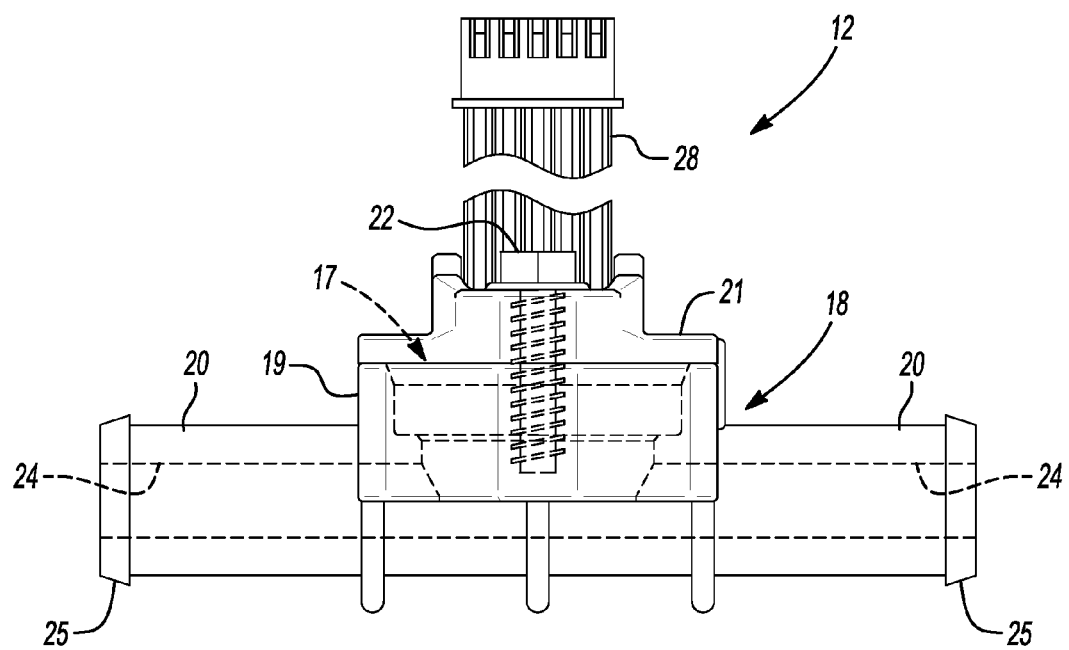
FIG. 3 is a front view of an exemplary probe module of a fluid flow rate sensor according to the present disclosure.
Figure 4:
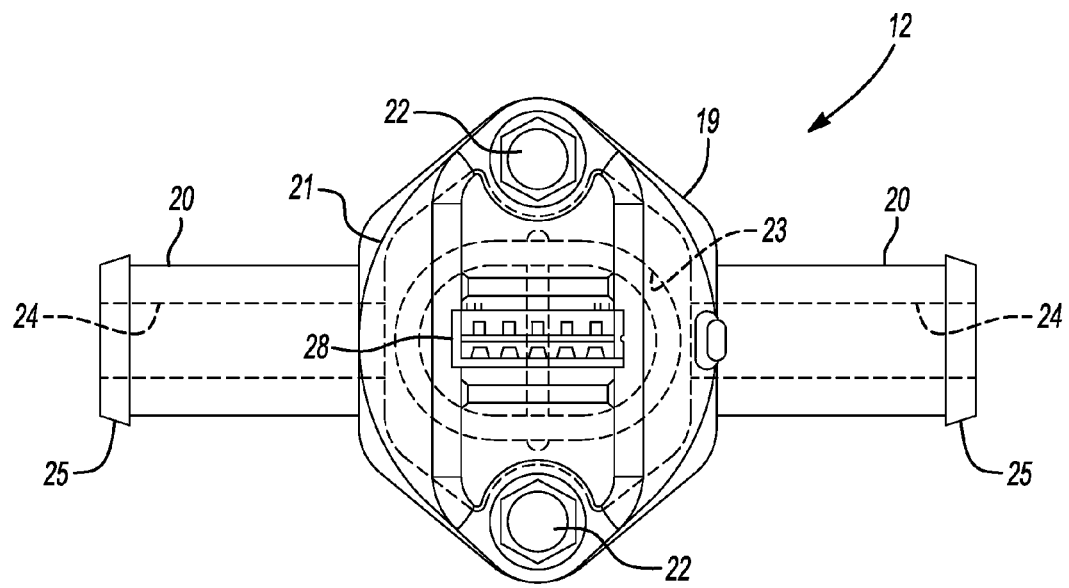
FIG. 4 is a top view of an exemplary probe module of a fluid flow rate sensor according to the present disclosure.

FIG. 1 generally depicts the major components of a fluid flow rate sensor 10 according to the present disclosure. The fluid flow rate sensor 10 may be employed in a household appliance such as, for example, a refrigerator, washing machine, dishwasher, water dispenser, or automatic ice maker, to monitor water flow therein.

The sensor 10 generally includes a probe module 12, a control module 14, and, optionally, an I/O module 16. The probe module 12 is coupled to the control module 14. As used in this description, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

When the probe module 12 is subjected to the flow of a fluid 11, the probe module 12 undergoes a changed condition and generates electrical signals 13 corresponding to such changes. The signals 13 are continuously sent to the control module 14 for processing, which, in turn, generates an output 15 indicative of a fluid flow rate. The I/O module 16 provides a means by which the fluid flow rate sensor 10 can communicate its output 15 to other device(s) or a user.

Referring to FIGS. 2 through 6, the probe module 12 includes a probe portion 17 and a housing portion 18 for mounting the probe portion 17 to a fluid source. The housing portion 18 includes a body 19, a pair of tubes 20 formed at opposing ends of the body 19, a cover 21 secured to the body 19 by screws 22. The body 19 defines a chamber 23 (shown in FIG. 4) and the tubes 20 define a passageway 24 extending along a longitudinal axis of the tubes 20. The chamber 23 is in fluid communication with the passageway 24. The tubes 20 may be provided with annular flanges 25 at their free ends to facilitate connection of the tubes 20 to the fluid source, such as the flexible supply hose of a water dispenser, for example.

The probe portion 17 is inserted into the chamber 23 of the body 19 through the cover 21. The probe portion 17 is a thermo-anemometer and includes a substrate 26 (shown, for example, in FIGS. 5 and 6) on which is disposed a detection circuit 32. The substrate 26 lies in the chamber 23 and a cable portion 28 is connected to the substrate 26. The cable portion 28 extends to outside of the chamber 23 and is electrically connected to the control module 14.

The substrate 26 may be a printed circuit board on which a detection circuit 32 (such as the example shown in FIGS. 5-7) is deposited. The substrate 26 is subjected to the flow of fluid 11 that is intended to be monitored. A thin vacuum-deposited Parylene coating may be deposited on the surfaces of the substrate 26 to reduce the thermal mass of the substrate 26.

The probe module 12 may have varied electrical characteristics depending on the arrangement of the detection circuit 32 on the substrate 26. By unscrewing the screws 22 and removing the cover 21 from the body 19, the probe portion 17 may be interchanged with another probe portion 17 having different electrical characteristics so that the probe module 12 may be more suitable for other fluids and/or other operating conditions. Moreover, when the probe module 12 ceases to provide the desired function, only the probe portion 17 needs to be replaced. Therefore, it is expected that the probe module 12 of the present disclosure can result in a reduction in replacement and/or component costs.

Figure 7:
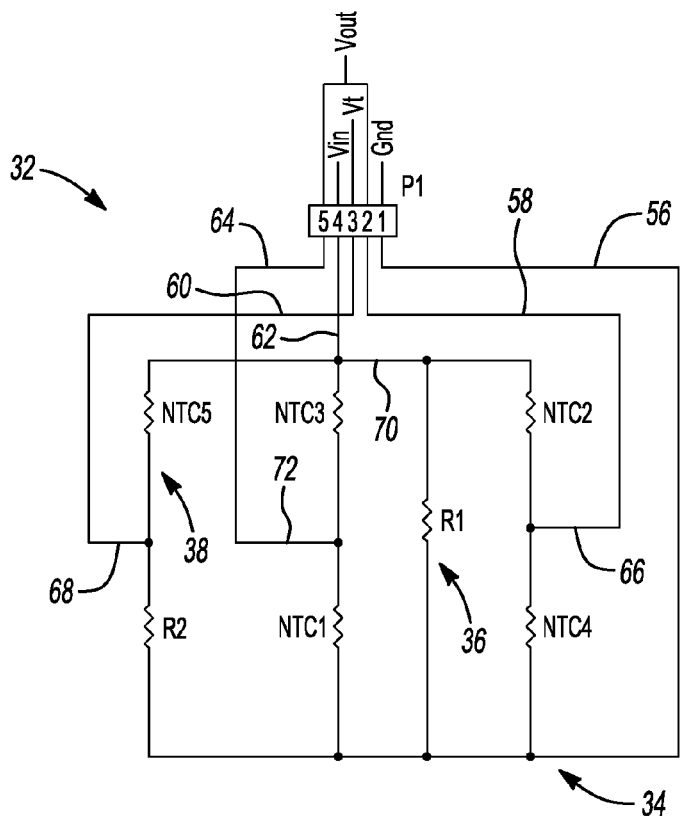
FIG. 7 is a schematic circuit diagram for an exemplary detection circuit for a fluid flow rate sensor according to the present disclosure.

One exemplary detection circuit 32 that can be employed in the fluid flow rate sensor according to the present disclosure is shown in FIGS. 5, 6 and 7. In FIG. 7, a schematic circuit diagram for the detection circuit 32 is shown. FIGS. 5 and 6 illustrate a physical embodiment of the detection circuit 32 on the substrate 26.

The substrate 26 contains the detection circuit 32 on its two sides. The substrate 26 has pin connectors P1, P2, P3, P4 and P5 to which the cable portion 28 is connected at end 30. The detection circuit 32 (FIG. 7) includes a bridge circuit 34, a heating circuit 36, and a temperature sensing circuit 38. The bridge circuit 34 includes four thermistors NTC1, NTC2, NTC3 and NTC4 screen-printed on a front side 40 of the substrate 26. The heating circuit 36 includes a heating resistor 1R1 screen-printed on a back side 42 of the substrate 26. The heating resistor 1R1 on the back side 42 is disposed in close proximity to thermistors NTC1 and NTC2 on the front side 40 to heat thermistors NTC1 and NTC2 during operation. NTC3 and NTC4 are physically located further away and upstream from heating resistor R1 such that they are not heated by the heating resistor R1 during operation. The temperature sensing circuit 38 includes a fixed resistor R2 and a thermistor NTC5 screen-printed on the back side 42 of the substrate 26 and adjacent to thermistors NTC3 and NTC4 on the front side 40. Thermistors NTC1, NTC2, NTC3, NTC4 and NTC5 have negative temperature coefficient. The thermistor NTC5 and the fixed resistor R2, are also disposed upstream from the heating resistor R1 and the heated thermistors NTC1 and NTC2.

As shown in FIG. 7, the bridge circuit 34, the heating circuit 36 and the temperature sensing circuit 38 are connected in parallel. The bridge circuit 34 is a four-wire bridge circuit having a first leg and a second leg connected in parallel. The thermistor NTC1 is coupled in series with the thermistor NTC3 to form the first leg. The thermistor NTC2 is coupled in series with the thermistor NTC4 to form the second leg. The two thermistors NTC2 and NTC4 may be properly chosen to have a temperature coefficient $\beta$ and room temperature resistance Ro smaller than that of thermistor NTC1 and NTC3 so that the bridge circuit 34, the function of which is to measure fluid flow rate, becomes much less sensitive to the fluid temperature.

The substrate 26 may be formed from a highly thermally conductive ceramic upon which is screen printed a ceramic-filled paste material that forms the thermistors NTC 1 through NTC5. Such material is available from Heraeus Incorporated, Circuit Materials Division under the R100 Series designation. Such a configuration completely eliminates discrete thermistor components and helps to reduce the thermal mass of the probe module 12.

The heating circuit 36 is connected in parallel to the two legs of the bridge circuit 34. The heating resistor R1 may have a rating of as high as 4 to 6 watts, and as low as 0.5 to 1.5 watts. It should be understood that more than one heating resistor in parallel or in series may be provided in the heating circuit 34 without departing from the spirit of the present disclosure.

The temperature sensing circuit 38 includes thermistor NTC5 and the fixed resistor R2 formed as a voltage divider. The temperature sensing circuit 38 is connected in parallel to the bridge circuit 34 for measuring the temperature of the fluid upstream from the heating resistor R1.

The values for the various components in the detection circuit 32 shown in FIG. 7 are as follows:

| Component | Resistance | Coefficient of Resistance (β) |
| --- | --- | --- |
| NTC1 | 100 kΩ | 4,700 K |
| NTC2 | 100 kΩ | 4,700 K |
| NTC3 | 100 kΩ | 4,700 K |
| NTC4 | 100 kΩ | 4,700 K |
| NTC5 | 100 kΩ | 4,700 K |
| R1 | 96 kΩ | |
| R2 | 100 kΩ | |

The detection circuit 32 includes conductive traces 56, 58, 60, 62, 64 that lead to a plurality of pin connectors P1, P2, P3, P4, and P5, respectively. The pin connectors P1, P2, P3, P4 and P5 are provided at the end 30 (FIGS. 5 and 6) of the probe module 12.

The conductive trace 56 is disposed adjacent to NTC1 and NTC4 of the bridge circuit 34 and is grounded at pin connector P1. The conductive trace 58 is coupled to the second leg of the bridge circuit 34 at terminal 66 between thermistors NTC2 and NTC4. The conductive trace 60 is connected to the temperature sensing circuit 38 at terminal 68 between the thermistor NTC5 and the fixed resistor R2. The conductive trace 62 is connected to the bridge circuit 34 at terminal 70 adjacent to thermistors NTC2 and NTC3. The conductive trace 64 is coupled to the first leg of the bridge circuit 34 between thermistor NTC1 and thermistor NTC3.

An input voltage $V_{in}$ (for example, 12 $V_{DC}$) may be applied through pin connector P4 at terminal 70 to energize the detection circuit 32. An output voltage $V_{out}$ is measured across terminals 66 and 72 and can be read at pin connectors P2 and P5. A reference voltage $V_T$ representative of temperature of the fluid can be measured at pin connector P3.

Figure 9:
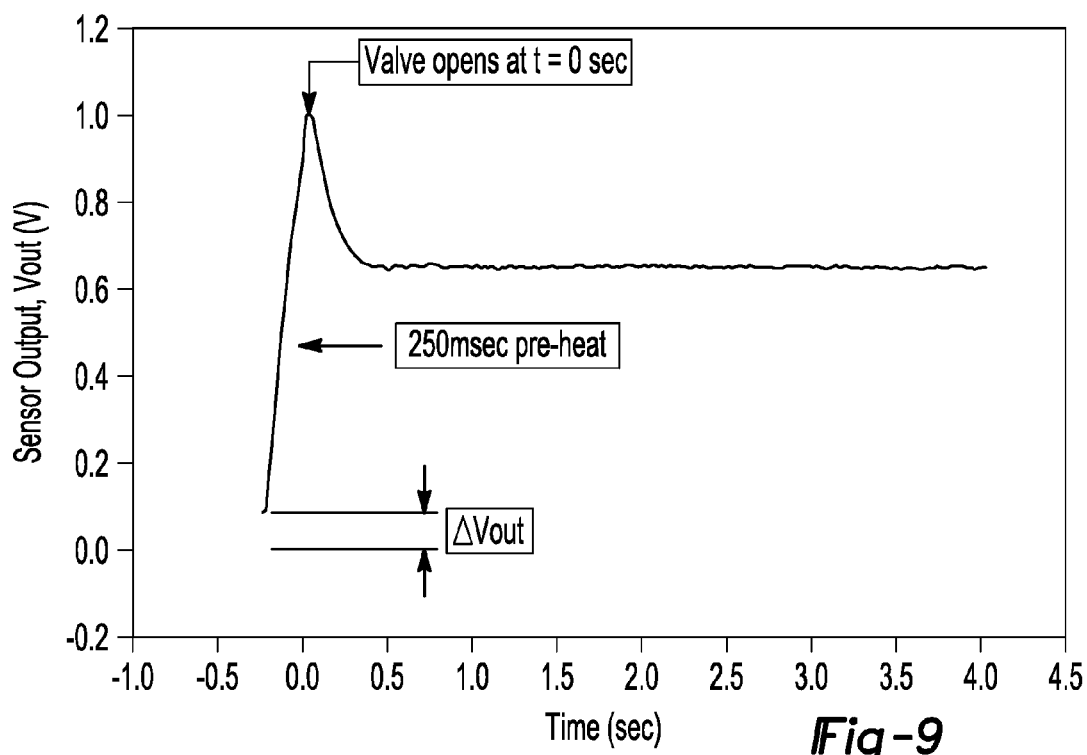
FIG. 9 is an exemplary graph plotting the temperature response over time for a fluid flow rate sensor according to the present disclosure.
Figure 8:
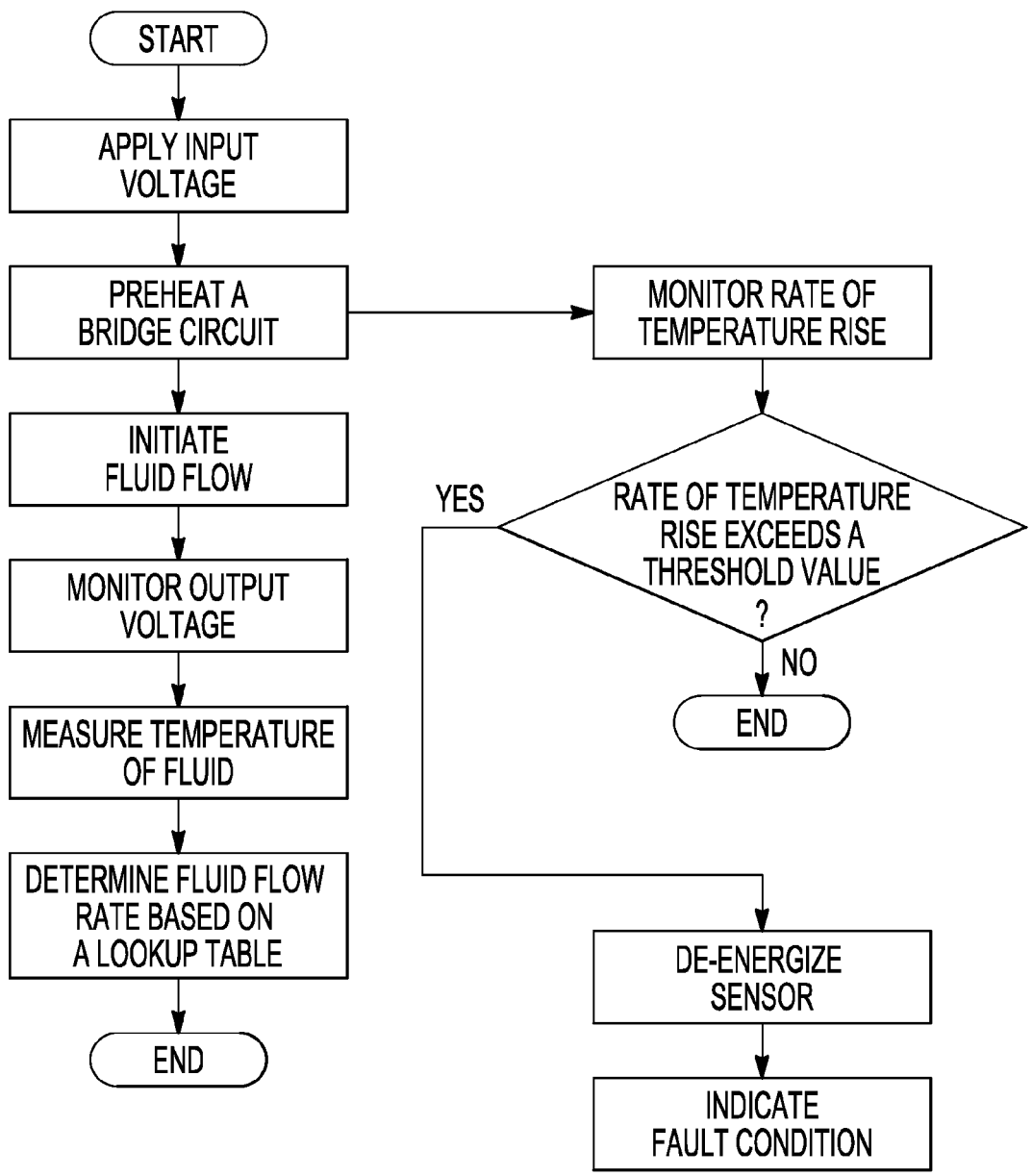
FIG. 8 is a flow chart describing the operation of a fluid flow rate sensor according to the present disclosure.
Figure 10:
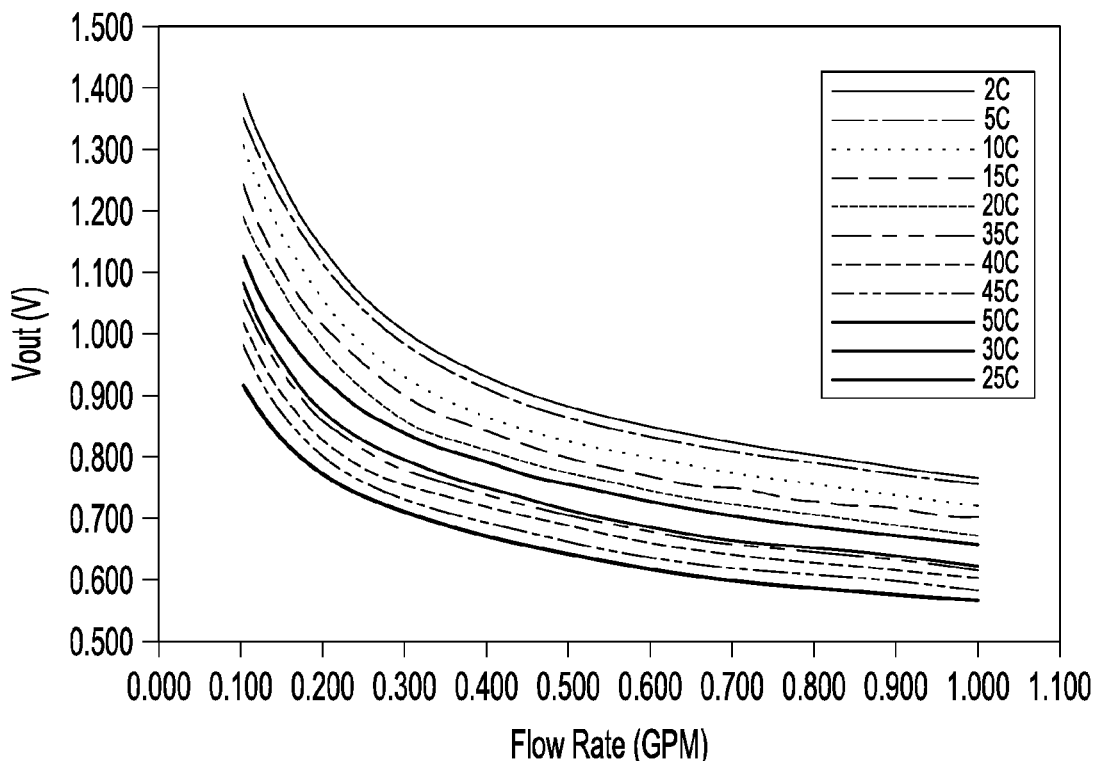
FIG. 10 is a graph showing the relationship among a flow rate, an output voltage, and the fluid temperature and illustrating the content of a two-dimensional look-up table for use in one embodiment of a fluid flow rate sensor according to the present disclosure.

Referring to FIGS. 8 through 10, before the initiation of the fluid flow, an input voltage $V_{in}$ is applied to the detection circuit 32 so that the heating circuit 36 can preheat thermistors NTC1 and NTC2 to a predetermined elevated temperature. The thermistors NTC3 and NTC4 are not heated due to physical separation between them and heating resistor R1. As shown in FIG. 9, as soon as the detection circuit 32 is energized, the detection circuit 32 generates an output voltage of $\Delta V_{out}$ across the bridge circuit 36 read at pin connectors P2 and P5. $\Delta V_{out}$ is an offset voltage indicating an imbalance in the four-wire bridge circuit 34. To use a bridge circuit to measure the fluid flow rate, a balanced bridge circuit 34 (i.e., zero output voltage) is generally required before the initiation of the fluid flow. This offset voltage is a result of manufacturing deviations from the designed specifications for one or more components of the detection circuit 32. Instead of calibrating the individual components of the detection circuit 32, this offset voltage $\Delta V_{out}$ can be stored in the control module 14 and added to or subtracted from a look-up table, which will be described later. Therefore, factory calibration of the individual components may not be necessary.

During this preheating period, as the thermistors NTC1 and NTC2 are heated, the resistance of the thermistors NTC1 and NTC2 is decreased and the output voltage $V_{out}$ is increased. The rate of the temperature rise of the thermistors NTC1 and NTC2 is monitored and recorded so that a signal corresponding to the rate of temperature rise is transmitted to the control module 14. This pre-heating time is about 250 ms. Because the substrate 26 has a low-thermal-mass Parylene coating, it does not take long to heat the thermistors NTC1 and NTC2 to the predetermined elevated temperature.

When the thermistors NTC1 and NTC2 reach the predetermined elevated temperature, a valve which controls the fluid is opened and the fluid flow is initiated at time=zero seconds as shown in FIG. 9. As soon as the fluid is initiated, the probe module 12 is subjected to a stream of fluid, which absorbs the heat of the thermistors NTC1 and NTC2, resulting in a rapid temperature drop in the thermistors NTC1 and NTC2. The output voltage $V_{out}$ also drops rapidly. The fluid flow is required to reach a steady-state condition before the control module 14 begins to estimate the volume of water that has been dispensed. The time required to reach steady-state depends on the flow rate of the fluid. The faster the fluid flow, the less time required to reach a steady state. During the period that the fluid flow has not reached a steady state condition, the control module 14 may assume a constant fluid flow rate (e.g., a flow rate corresponding to the flow rate first measured after reaching a steady state).

Due to the low thermal mass Parylene coating on the substrate 26, it does not take long to reach a steady state (typically, about 500 msec). At the steady state, the temperature of the fluid is determined from the output voltage $V_T$ read at power connector P3 in a well-known manner. The output voltage $V_{out}$ is a function of the fluid flow rate and the fluid temperature and is read at P2 and P5. The output voltages $V_{out}$ and $V_T$ of the detection circuit 32 may be sampled by the control module 14 at discrete time intervals (e.g., 10 ms).

After the data regarding the fluid temperature and the output voltage $V_{out}$ are recorded, the control module 14 determines the fluid flow rate according to a look-up table.

FIG. 10 graphically illustrates an exemplary two-dimensional look-up table used by the control module 14 to determine the flow rate of water. This graph shows a plurality of curves, each indicating a relationship between the output voltage of the bridge circuit 34 and the fluid flow rate at a given fluid temperature. Each of the curves were generated from data points (x=flow rate, y=$V_{out}$) that were obtained in a laboratory under controlled conditions (e.g., flow rates and fluid temperatures). A curve was then fit to the data points in a well-known manner. Using the look-up table, the fluid flow rate can readily be determined when the output voltage $V_{out}$ and fluid temperature $V_T$ are measured or read by the control module 14.

FIG. 11 illustrates another embodiment of a detection circuit 100 for use with a fluid flow rate sensor of the present disclosure, this one incorporating temperature compensation circuitry. The detection circuit 100 in this embodiment is generally similar to the detection circuit 32 of FIG. 7, except that it includes a temperature compensation circuit and the temperature sensing circuit may be optional, as desired. More specifically, the detection circuit 100 including a first bridge circuit 102, a second bridge circuit 104, a heating circuit 106 connected in parallel. The first bridge circuit 102 includes four thermistors NTC1, NTC2, NTC3 and NTC4 for the purpose of measuring the fluid flow rate. The first bridge circuit 102 has two legs, with each leg including two thermistors. The arrangement of the first bridge circuit 102 and the heating circuit 106 of this embodiment is similar to that of the bridge circuit 34 and the heating circuit 36 in FIG. 7. The second bridge circuit 104 includes compensating resistors Rcomp1, Rcomp2, Rcomp3 and Rcomp4 which are connected in parallel with respective bridge thermistors NTC1, NTC2, NTC3 and NTC4, respectively. This arrangement functions as a temperature compensation circuit. The second bridge circuit 104 includes two legs, with each leg having two compensating resistors. The compensating resistors Rcomp1 through Rcomp4 can be deposited (e.g., by screen-printing)

directly on the substrate 26, or externally connected to the four wire bridge circuit (e.g., as part of the control module 14).

Optionally, the detection circuit 100 may include a temperature sensing circuit 108 including a thermistor NTC5 and a fixed resistor R2. As in the detection circuit 32 of FIG. 7, the temperature sensing circuit 108 may be provided upstream of the heating circuit 106. In this embodiment, however, the measurement of the fluid temperature by the temperature sensing circuit 108 is not necessary for determining the fluid flow rate as discussed above. The temperature sensing circuit 108 is optional and provides an output $V_T$ corresponding to the fluid temperature, if desired.

In a fluid flow rate sensor having temperature compensation, only a one-dimensional look-up table is required to determine fluid flow rate, because fluid temperature is removed as a variable under consideration. For the detection circuit 100, having values for the thermistors NTC1, NTC2, NTC3 and NTC4 and compensating resistors Rcomp1, Rcomp2, Rcomp3 and Rcomp4 as set forth in the table below, FIG. 12 illustrates the value for $V_{out}$ at a given fluid flow rate within the range of 0.1 to 1.3 GPM for fluid temperatures of 0.5° C., 25° C. and 50° C.

| Component | Resistance | Coefficient of Resistance (β) |
|---|---|---|
| NTC1 | 100 kΩ | 4,700 K |
| NTC2 | 10 kΩ | 3,375 K |
| NTC3 | 100 kΩ | 4,700 K |
| NTC4 | 10 kΩ | 3,375 K |
| Rcomp1 | 9.8 kΩ | |
| Rcomp2 | 101 kΩ | |
| Rcomp3 | 10.8 kΩ | |
| Rcomp4 | 104 kΩ | |

As shown in FIG. 12, the output voltage $V_{out}$ is independent of the temperature of the fluid. As a result, the control module 12 requires less memory storage space for the one-dimensional look-up table than is required in a control module for a fluid flow rate sensor not having temperature compensation. The fluid flow rate sensor having temperature compensation also eliminates the need for software that provides temperature compensation, it improves measurement speed, and reduces overall system costs.

While the fluid flow sensor response shown in FIGS. 10 and 12 are for water, the flow rate of other fluids may, of course, be measured by the device according to the present disclosure. Such other fluids would each have corresponding look-up tables of data for use in the device.

As previously set forth, if the fluid flow rate sensor 10 has an offset voltage $\Delta V_{out}$ immediately after the detection circuit 32 is energized, the detection circuit 32 may need to be calibrated. The calibration may be achieved by adding/subtracting the offset voltage $\Delta V_{out}$ to/from the output voltage of the look-up table.

In addition to determining the fluid flow rate, the sensor of the present disclosure can be used to determine a fault condition of the sensor. During the preheating period and upon initiation of the fluid flow, the rate of the temperature rise of the sensor is monitored and recorded. When the rate of the temperature rise is excessive (e.g., above a pre-determined threshold value), the control module 14 may determine that the fluid flow rate sensor 10 is in a dry condition (i.e., not subjected to the fluid flow). The control module 14 may generate a fault condition and may de-energize the fluid flow rate sensor 10. Alternatively, or in addition, other appliances and/or components may be shut down due to the dry condition.

It should be appreciated that the number of thermistors and heating resistors may vary depending on the application for the fluid flow rate sensor. Also, the heating circuit may include more than one heating resistor connected in series or in parallel. Furthermore, heating resistor(s) and the(ir) corresponding voltage source may be omitted altogether in applications where the thermistor(s) can be internally self-heated.

This description is merely exemplary in nature and, thus, variations that do not depart from the gist of the disclosure are intended to be within the scope of the disclosure. Such variations are not to be regarded as a departure from the spirit and scope of the invention.

What is claimed is:

1. A fluid flow rate sensor for detecting a flow rate of a fluid comprising:
    a probe module including a detection circuit, the detecting circuit generating a first signal corresponding to an output voltage and a second signal corresponding to a temperature of the fluid;
    a control module communicating with the detection circuit and including a look-up table, the look-up table correlating one of a plurality of pairs of voltage values and temperature values to one of a plurality of flow rate values of the fluid, the control module obtaining the value of the flow rate of the fluid from the look-up table based on the first signal and the second signal.

2. The fluid flow rate sensor of claim 1, wherein the output voltage is a function of the temperature and the flow rate of the fluid.

3. The fluid flow rate sensor of claim 1, wherein the detection circuit includes a bridge circuit, which generates the first signal.

4. The fluid flow rate sensor of claim 3, wherein the bridge circuit includes two legs connected in parallel and two thermistors at each leg.

5. The fluid flow rate sensor of claim 4, wherein the output voltage is measured at middle points of the two legs.

6. The fluid flow rate sensor of claim 3, wherein the detection circuit comprises a voltage divider which generates the second signal.

7. The fluid flow rate sensor of claim 6, wherein the voltage divider is connected in parallel to the bridge circuit.

8. The fluid flow rate sensor of claim 7, wherein the voltage divider is disposed upstream from the bridge circuit.

9. The fluid flow rate sensor of claim 8, wherein the voltage divider includes a thermistor and a resistor of a known resistance.

10. The fluid flow rate sensor of claim 1, further comprising a substrate on which the detection circuit is screen-printed.

11. The fluid flow rate sensor of claim 10, further comprising a Parylene coating over the substrate.

12. The fluid flow rate sensor of claim 1 further comprising an input/output module in communication with the control module.

13. A fluid flow rate sensor for detecting a flow rate of a fluid, comprising:
    a probe module comprising a printed circuit board substrate, a detection circuit screen-printed onto the substrate, and a Parylene coating layered over the detection circuit and the substrate;
    wherein the detection circuit comprises:
    a bridge circuit provided on a first side of the substrate and including at least one thermistor, the bridge circuit generating a first signal indicative of an output voltage across the bridge circuit, the output voltage being a function of a temperature of the fluid and the flow rate of the fluid;
a temperature sensing circuit provided on a second side of the substrate opposite to the first side for detecting the temperature of the fluid and generating a second signal indicative of the temperature of the fluid; and
a heating circuit provided on the second side of the substrate for heating the at least one thermistor;
and wherein the bridge circuit, the temperature sensing circuit and the heating circuit are connected in parallel and the temperature sensing circuit is provided upstream from the bridge circuit; and
a control module communicating with the detection circuit and including a look-up table for determining the flow rate of the fluid, the look-up table directly correlating the flow rate of the fluid, the temperature of the fluid, and the output voltage of the bridge circuit, the control module determining the flow rate of the fluid from the look-up table based on the first signal and the second signal.

14. The fluid flow rate sensor of claim 13 further comprising an input/output module communicating with the control module.

15. A temperature-compensated fluid flow rate sensor for detecting a flow rate of a fluid comprising:
a probe module including a detection circuit, the detecting circuit generating a first signal corresponding to an output; and
a control module communicating with the detection circuit and including a one-dimensional look-up table, the look-up table including data correlating each of a plurality of voltage values with one of a plurality of flow rate values, the control module determining the flow rate of the fluid from the look-up table based on the first signal.

16. The fluid flow rate sensor of claim 15, wherein the output voltage is only a function of the flow rate of the fluid.

17. The fluid flow rate sensor of claim 15, wherein the detection circuit includes a bridge circuit, which generates the first signal.

18. The fluid flow rate sensor of claim 17, wherein the bridge circuit includes two legs connected in parallel and two thermistors at each legs, and further comprising four temperature compensating resistors connected in parallel with the four thermistors.

19. The fluid flow rate sensor of claim 18, wherein the output voltage is measured at the middle points of the two legs.

20. The fluid flow rate sensor of claim 15, wherein the probe module further comprises a substrate on which the detection circuit is screen-printed.

21. The fluid flow rate sensor of claim 20, wherein the probe module further comprises a Parylene coating over the substrate.

22. A temperature-compensated fluid flow rate sensor for detecting a flow rate of a fluid, comprising:
a probe module including a printed circuit board, a detection circuit screen-printed on the substrate, and a Parylene coating on the substrate, the detection circuit comprising:
a bridge circuit provided on a first side of the printed circuit board and including at least one thermistor, the bridge circuit generating a first signal indicative of an output voltage across the bridge circuit, the output voltage being a function of the flow rate of the fluid; and a heating circuit provided on the second side of the substrate for heating the at least one thermistor, wherein the bridge circuit and the heating circuit are connected in parallel,
a control module communicating with the detection circuit and including a look-up table for determining the flow rate of the fluid, the look-up table correlating each of a plurality of voltage values with one of a plurality of fluid flow rate values, the control module determining the flow rate of the fluid from the look-up table based only on the first signal; and
an I/O module communicating with the control module.

23. A fluid flow rate sensor for detecting a flow rate of a fluid, comprising:
a probe module including a printed circuit board, a detection circuit screen-printed on the substrate, and a Parylene coating on the substrate, the detection circuit comprising:
a first bridge circuit provided on a first side of the printed circuit board and including at least one thermistor, the first bridge circuit generating a first signal indicative of an output voltage across the first bridge circuit, the output voltage being a function of the flow rate of the fluid;
a second bridge circuit connected in parallel to the first bridge circuit, the second bridge circuit including at least one fixed resistor corresponding to the at least one thermistor, the at least one fixed resistor providing temperature compensation for the at least one thermistor;
a heating circuit provided on the second side of the substrate for heating the at least one thermistor, the heating circuit connected in parallel to the first bridge circuit, and
a control module communicating with the first bridge circuit and including a look-up table for determining the flow rate of the fluid, the look-up table correlating one of a plurality of voltage values to one of a plurality of flow rate values, the control module determining the flow rate of the fluid from the look-up table based only on the first signal.

24. The fluid flow rate sensor of claim 23, wherein the detection module further comprises a temperature sensing circuit for measuring the temperature of the fluid.

25. A method of operating a fluid flow rate sensor comprising a detection circuit, the method comprising:
creating a look-up table of fluid flow rate values, the table correlating one of a plurality of pairs of voltage output values of the detection circuit and temperature values of a fluid to one of a plurality of flow rate values of the fluid;
preheating at least portions of the detection circuit to a predetermined elevated temperature;
initiating flow of the fluid;
measuring a temperature of the fluid;
measuring a voltage output of the detection circuit, the voltage output being a function of a flow rate and the temperature of the fluid; and
obtaining the fluid flow rate value from the look-up table.

26. The method of claim 25, wherein the look-up table is created from empirical data.

27. The method of claim 25, wherein the step of preheating comprises heating at least one thermistor of the detection circuit.

28. The method of claim 27, wherein the step of preheating is carried on for about 250 ms.

29. The method of claim 27, further comprising generating a signal indicative of a fault condition when a rate of temperature rise of the at least one thermistor exceeds a predetermined threshold value.

30. The method of claim 25, further comprising determining an offset voltage immediately after the detection circuit is energized.

31. The method of claim 30, further comprising using the offset voltage to calibrate the detection circuit.

32. The method of claim 25, wherein the step of preheating is carried on for about 250 ms.

* * * * *